United States Patent [19]

Shutic

[11] Patent Number: 5,326,599
[45] Date of Patent: Jul. 5, 1994

[54] CABIN PURGE SYSTEM FOR AUTOMOTIVE POWDER COATING

[75] Inventor: Jeffrey R. Shutic, Wakeman, Ohio

[73] Assignee: Nordson Corporation, Westlake, Ohio

[21] Appl. No.: 16,612

[22] Filed: Feb. 11, 1993

[51] Int. Cl.⁵ ............................ B05D 1/06; B05D 1/12
[52] U.S. Cl. .................... 427/478; 427/421;
118/50; 118/308; 118/326; 118/621; 454/52; 454/53
[58] Field of Search ............... 118/50, 300, 308, 309, 118/620, 621, 634, 326; 427/421, 469, 478; 454/50, 52, 53

[56] References Cited

U.S. PATENT DOCUMENTS

| | | | |
|---|---|---|---|
| 2,897,743 | 8/1959 | Marantz | 454/53 X |
| 3,537,426 | 11/1970 | Spiller | 118/622 X |
| 3,853,581 | 12/1974 | Fabre | 118/309 X |
| 4,212,266 | 7/1980 | Payne et al. | 118/622 X |
| 4,381,729 | 5/1983 | Gernez | 118/622 |
| 4,898,116 | 2/1990 | Kozoe et al. | 118/621 |
| 4,987,001 | 1/1991 | Knobbe et al. | 118/622 X |
| 5,092,267 | 3/1992 | Hajek | 118/621 X |
| 5,095,811 | 3/1992 | Shutic et al. | 454/52 |
| 5,178,679 | 1/1993 | Josefsson | 454/53 X |
| 5,245,763 | 9/1993 | Neikter | 118/326 X |

FOREIGN PATENT DOCUMENTS 2153395  5/1973  Fed. Rep. of Germany .
91/03322  3/1991  PCT Int'l Appl. .

*Primary Examiner*—Michael W. Ball
*Assistant Examiner*—Francis J. Lorin
*Attorney, Agent, or Firm*—Rankin, Hudak & Hill

[57] ABSTRACT

A method and apparatus for powder spraying a automotive or other vehicle body in a powder spray booth includes a cabin purge zone in which a pair of inlet hood assemblies are positioned to the side window openings on each side of the body and the cavity is purged of excess powder by extracting the powder from the cavity through the inlet hood assemblies. The effective and efficient removal of suspended oversprayed powder from the interior of the vehicle cabin is accomplished through the production of a symmetrical air flow through the vehicle cabin in which air is exhausted through the two side window openings while the interior of the vehicle cabin is replenished with air through the front windshield opening and the rear window opening.

9 Claims, 2 Drawing Sheets

CABIN PURGE SYSTEM FOR AUTOMOTIVE POWDER COATING

BACKGROUND OF THE INVENTION

1. Field of the Invention

This invention relates to powder coating systems, and more particularly, to systems for spraying powder coating material onto objects such as automotive or other vehicle bodies.

2. Description of the Prior Art

The spraying of solid particulate materials for coating automotive and other vehicle bodies has been used for a number of years. The spraying can be accomplished using electrostatic spraying techniques in a spray booth which includes an elongated tunnel-like construction having an inlet for the ingress of the vehicle body, a coating application area, a curing or drying area in some designs, and an outlet for the egress of the vehicle body. Conditioned air is introduced in the spray booth by an air feed blower into a plenum chamber at the top of the booth and is directed downwardly toward the vehicle body moving through the booth. This flow of conditioned air picks up oversprayed powder coating material, i.e., material which does not adhere to the vehicle body, and is then drawn downwardly through the sides and/or floor of the booth by one of more air exhaust fans. Filters are provided to remove the particulate powder material from the air, and the resulting filtered or clean air is withdrawn from the booth for expulsion to atmosphere or for recirculation to the conditioned air supply while the recovered powder material is sent to a recovery system for classification and re-use.

This air flow system is generally effective in removing oversprayed powder from the booth. However, in the spraying of vehicle car bodies, the inside or cabin of the vehicle body can be partially isolated from this air flow, and much of the oversprayed powder in the vehicle cabin may not be significantly affected by this air flow system. As a result, oversprayed powder can remain aloft within the vehicle cabin for an extended period of time. When the powder in the vehicle cabin remains aloft after the vehicle body has left the spray zone, the suspended overspray may be conveyed into subsequent zones in the spray booth. This, in turn, can lead to contaminated downline processes or process equipment.

SUMMARY OF THE INVENTION

The present invention provides a method and apparatus for a powder spraying system for automotive and other vehicle bodies that includes a system for effectively removing the suspended powder overspray within the cabin of the vehicle.

The effective and efficient removal of suspended oversprayed powder from the interior of the vehicle cabin is accomplished in accordance with the present invention through the production of a unique symmetrical air flow through the vehicle cabin in which air is exhausted through the two side window openings while the interior of the vehicle cabin is replenished with air through the front windshield opening and the rear window opening. In this manner, the present invention avoids the creation of pockets which can retain suspended powder unaffected by the air flowing through the cabin interior.

The method and apparatus of the present invention includes the use of a pair of contoured inlet hood assemblies that are specially adapted and configured to fit the automobile body from the top of the glazing line to the bottom of the sill. The inlet hood assemblies couple the vehicle cabin with a vacuum power source, so that the cabin is effectively and rapidly exhausted through the side window openings, while the windshield and the rear window openings provide fresh air make-up.

Using the method and apparatus of the present invention, downline contamination of oversprayed powder is significantly reduced, since the suspended powder in the vehicle cabin which is not otherwise swept away by the air flow is almost entirely removed. The removed powder from the cabin is taken to a vacuum power source that includes a filter so that recovered powder can be reclaimed. Air exhausted from the cabin can also be returned to the booth after the material is separated.

The cabin purge system of the present invention is specially adapted for use in powder spraying systems. The spraying of solid particulate powder presents special problems not present in the spraying of liquids. While oversprayed powder has an ability to remain suspended in air almost indefinitely, liquids tend to settle much faster. The cabin purge system of the present invention is designed to cope with the special problems of powder by removing the air from the cabin in an effective and efficient manner. By removing the air quickly and efficiently, the need for a longer knockdown zone is reduced, and the spray line can operate at faster speeds, resulting in increased productivity.

An important feature in the purging system of the present invention is the creation of a symmetrical air flow pattern within the cabin. The present invention, in effect, divides the vehicle cabin in half with the longitudinal axis of the vehicle body providing the axis of symmetry. By using a pair of inlet hood assemblies for exhausting air from the cabin, one inlet hood assembly on each side of the vehicle body, and by relying upon the symmetrical positioning of the front windshield and rear window openings as the sole means for replenishing air to the cabin, the system of the present invention removes the suspended powder from the vehicle cabin in a symmetrical manner. Make-up air enters the cabin from the windshield opening in the front of the vehicle and through the rear window opening in the back, both of which are symmetrical with respect to the longitudinal axis of symmetry. The air inside the cabin is pulled from the cabin on each side as the make-up enters the cabin. This symmetrical air flow quickly and efficiently removes the air from the cabin and minimizes turbulence which may otherwise impede efficient air flow.

The method and apparatus of the present invention provides a cabin purge system which is effectively and efficiently used. Not only does the symmetrical air flow provide a very effective removal scheme, the inlet hood assemblies can also be automatically and accurately positioned as the body moves through a separate cabin purge zone in the booth. This cabin purge zone may also serve as a final transition or knock-down zone, so that the coating operation is not unduly lengthened.

These and other advantages are provided by the present invention of a method of powder spraying a workpiece having an exterior, openings on each side of the exterior and a hollow interior cavity connected to the openings. The method comprises the steps of spraying powder on the exterior of the workpiece, positioning a pair of inlet hood assemblies to the openings on each side of the workpiece, connecting the pair of inlet hood assemblies to a vacuum source, and purging the cavity of excess powder by extracting the powder from the cavity through the inlet hood assemblies by operation of the vacuum source.

In accordance with another aspect of the present invention, a cabin purge system is provided for powder spraying a vehicle body having an exterior, two opposed side window openings in the exterior, a front windshield opening in the exterior, a rear window opening in the exterior, and an interior cabin. The cabin purge system comprises means for spraying powder on the exterior of the vehicle body, a first inlet hood assembly for engaging one of the side window openings, a second inlet hood assembly for engaging the other of the side window openings, a vacuum source connected to both the first and second inlet hood assemblies for purging the cabin of excess powder by extracting the powder from the cabin through the inlet hood assemblies by operation of the vacuum source while allowing make-up air to enter the cabin through the windshield opening and the rear window opening.

DETAILED DESCRIPTION OF THE PREFERRED EMBODIMENTS

Figure 1:
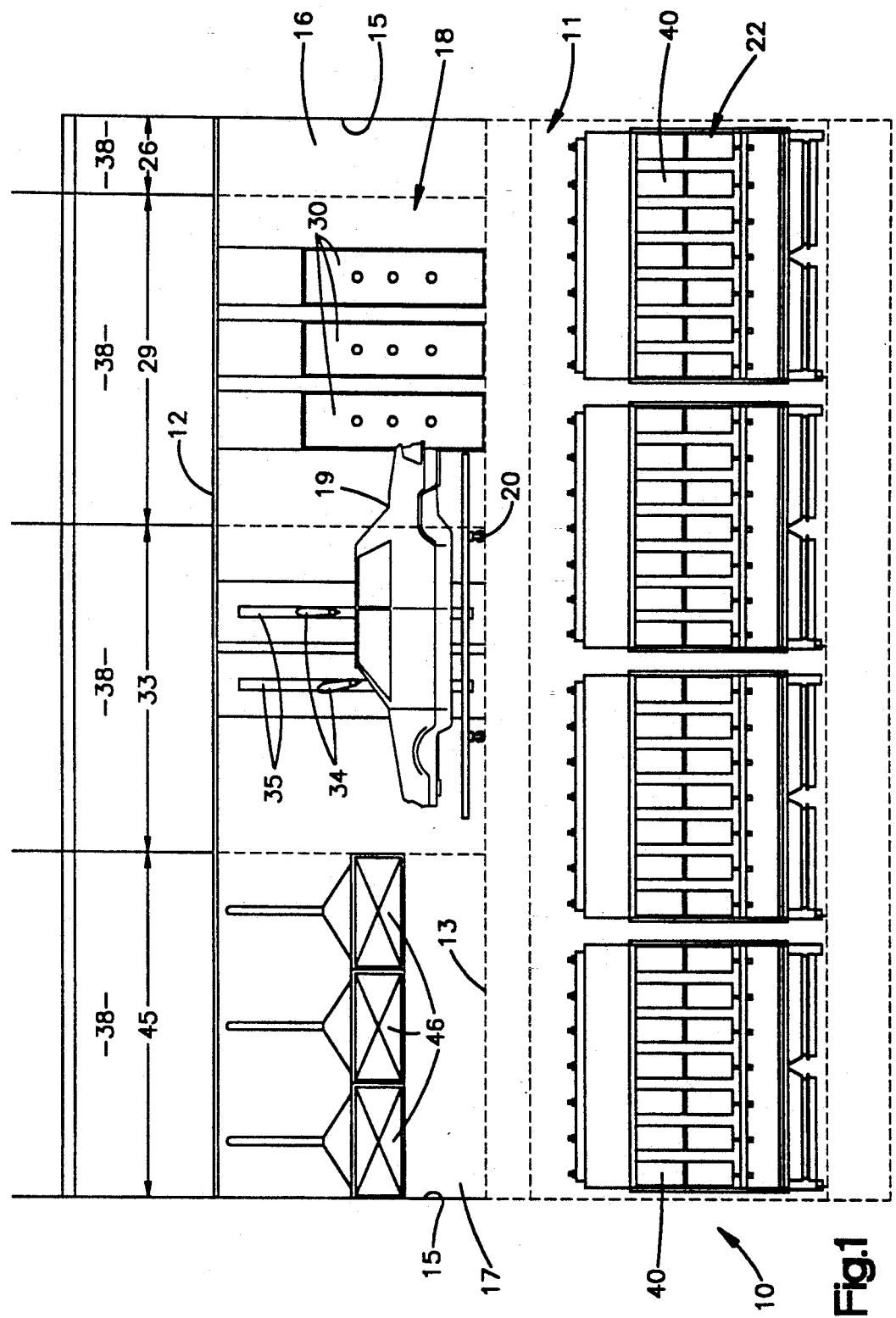
FIG. 1 is a side elevational view, partially schematic, of an automotive powder coating spray booth in accordance with this invention.

Referring more particularly to the drawings, and initially to FIG. 1, there is shown a powder coating system 10. The powder coating system is somewhat similar to that described in U.S. Pat. No. 5,095,811, the disclosure of which is incorporated herein by reference in its entirety. The powder coating system includes a spray booth 11 having a ceiling a floor 13, opposed outer side walls 14 (FIG. 2), and end walls 15 (FIG. 1) formed with a booth inlet 16 and booth outlet 17. The ceiling 12, the floor 13 and the walls 14 and 15 form an interior 18 defining a substantially controlled area in which to apply powder coating material onto objects such as a vehicle body 19 moved by a conveyor 20 through the spray booth 11. Oversprayed powder material which does not adhere to the vehicle body 19 passes through gratings 21 (FIG. 2) located along the floor 13 of the spray booth on each side of the conveyor 20 and into a powder collection and recovery system 22.

A spray coating operation performed in accordance with this invention includes a multi-stage powder coating sequence.

First, the vehicle body 19 is transported by the conveyor 20 through the booth inlet 16 into a no-spray or transition zone 26. The no-spray zone 26 is provided at the booth inlet 16 to help prevent the introduction of thermal currents or layers to the coating zones. It has been found that if the difference between the temperature of the conditioned air in the spray booth and the ambient temperature of the factory air at the booth inlet is large enough, thermal currents can be introduced into the coating zones which disrupt some of the air flow pattern which, in turn, affects the transfer efficiency of the powder coating material.

Next, the vehicle body 19 may be advanced into a cut-in zone (not shown) which has sufficient cross sectional area to permit opening of its doors. In this cut-in zone, hand-held or robotically manipulated powder dispensers such as spray guns may apply powder coating material onto the inside surfaces of the vehicle doors, hood, engine bay, trunk and other hard to reach areas. Once this spraying operation is completed, the vehicle body 19 is advanced into a side coating zone 29. The cut-in zone may not be present in all spray booths, and this zone is omitted from FIG. 1. It is understood, however, that if a cut-in zone is included it would be located between the no-spray zone 26 and the side coating zone 29, to the right of the side coating zone 29 as viewed in FIG. 1.

In the side coating zone 29, powder dispensers 30 are manipulated by automatically operated dispenser moving devices (not shown) to apply powder coating material through spray guns onto the vertically oriented surfaces of the vehicle body 19, such as the outside of doors, the fenders, and any other vertical surfaces. A typical side coating zone 29 may include six spray guns, with three spray guns on each side of the vehicle body.

The vehicle body 19 is then advanced from the side coating zone 29 into an overhead coating zone 33 where powder dispensers 34 located on an overhead carrier 35 above the path of the vehicle body 19 apply powder coating material through spray guns onto the horizontal surfaces of the vehicle body 19, such as the hood, roof and trunk. A typical overhead coating zone 33 may include five spray guns.

In order to collect oversprayed powder which does not adhere to the vehicle body 19 within any of the cut-in zone, the side coating zone 29 and the overhead coating zone 33, "make-up" air must be introduced into the booth interior 18 to pick up or entrain the powder material for delivery to the powder collection and recovery system 22. Powder collection is achieved within each of the coating zones.

In accordance with the conventional design of powder spray systems, powder collection may also be achieved within one or more "knock-down" or transition zones located between the different zones in the powder spray booth. If a cut-in zone is provided in the powder spray booth, a first transition zone may be located between the cut-in zone and the side coating zone 29. A second transition zone may be located between the side coating zone 29 and the overhead coating zone 33. The purpose of the transition zones is to collect oversprayed powder which is drawn by the slight draft or wake created by the movement of the vehicle body 19 through the booth interior 18. This draft or wake can draw the powder coating material overspray from the cut-in zone into the side coating zone 29 and/or from the side coating zone 29 into the overhead coating zone 33, which, unless collected within the transition zones, could adversely affect the spraying conditions in the booth 11.

In some instances, it has also been found to be desirous to provide a "knock-down" or transition zone at the booth outlet. The transition zone at the booth outlet helps prevent the draft or wake of the vehicle from pulling powder coating material overspray out of the booth which could contaminate vehicle processing areas downstream from the booth or the plant in general. As previously described, a transition zone may also be provided at the inlet in the form of the no-spray zone 26 to help prevent the introduction of thermal currents or layers to the coating zones.

Each of the coating zones is provided with a system for introducing make-up air into the coating zone, and for withdrawing filtered air from the bottom of the booth 11 into the powder recovery system 22. Similarly, the transition zones may be provided with comparable systems for introducing make-up air into the transition zone and for withdrawing filtered air from the booth interior 18.

Tempered make-up air is supplied by a feed duct (not shown) to an air plenum 38 located above the ceiling 12 of the spray booth. The plenum 38 extends over the length of the side coating zone 29 and the overhead coating zone 33. The plenum would also be provided for a cut-in zone and for any knock-down zones. Suitable air supply means introduce make-up or "conditioned" air, i.e., filtered and tempered air, through a feed duct into the plenum 3e which distributes the conditioned air along the length of each of the zones.

The exhaust portion of the air supply and exhaust system for the booth interior 18 includes the powder collection and recovery system 22 located at the base of the spray booth 11. Oversprayed powder from each of the zones passes through the grating 21 located in the floor 13 and enters a collector inlet duct 39. From the collector inlet duct 39, the powder falls into one or more collectors 40. Each of the collectors 40 contain filtering and separating devices for removing the recovered powder from the airstream. An example of a suitable collector 40 is a Model VCM-2-2 Collector available from Nordson Corporation of Westlake, Ohio. Each of the collectors 40 also has a pump for pumping the air from which the powder has been removed to a clean air plenum 41 located on the top of the collector 40. From the plenum 41, the clean air is conveyed to a clean air exhaust manifold through a duct 42.

The make-up air plenum 38 and the powder collection and recovery system 22 must be designed so as to provide laminar air flow about the vehicle. The air should be drawn to the floor 13 of the spray booth from the plenum 38, and the cross sectional area of the plenum should be approximately equal to the cross sectional area of the floor 13 of the booth beneath. This tends to eliminate lateral or horizontal cross drafts, and produces an air flow which is substantially downdraft flow. A laminar air flow increases the transfer efficiency of the powder to the vehicle.

However, this laminar downdraft air flow does not promote the flow of air through the interior cabin of the vehicle body 19. As a result, oversprayed powder in the vehicle cabin tends to remain aloft for extended period of time. Unless this suspended powder is removed, it could contaminate downline processes or process equipment.

Figure 2:
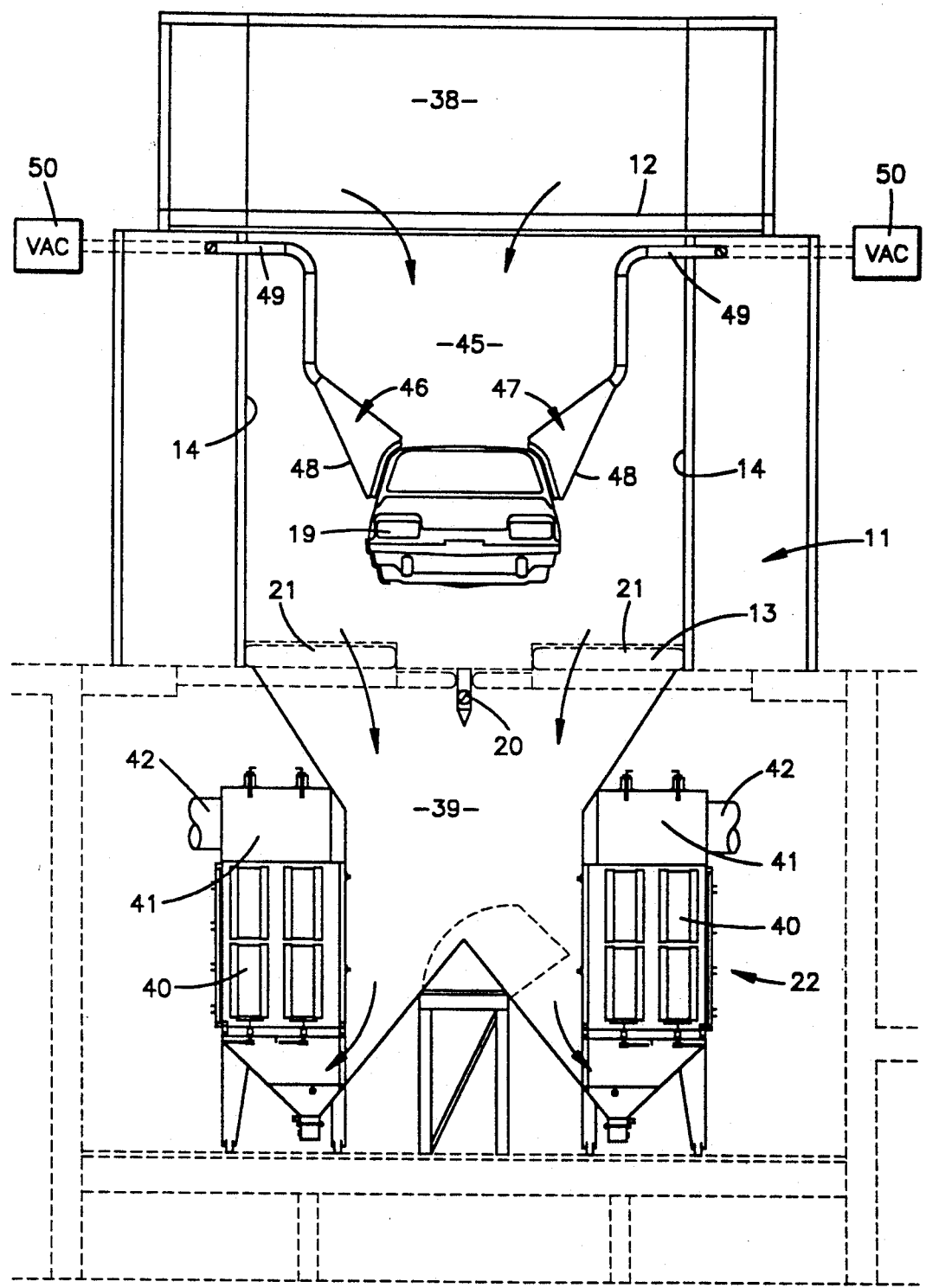
FIG. 2 is a front elevational view, also partially schematic, of the cabin purge zone of the spray booth of FIG. 1.

In accordance with this invention, an additional zone is provided downline of the overhead coating zone 33. This additional zone is a cabin purge zone 45. As shown in FIGS. 1 and 2, the cabin purge zone 45 includes one or more pairs of inlet hood assemblies 46 and 47 on each side of the path of the vehicle body 19. In the embodiment shown in FIGS. 1 and 2, three pairs of inlet hood assemblies 46 and 47 are shown. Each of the inlet hood assemblies 46 and 47 includes a hood 48 which is specially configured to fit around the side window openings in the vehicle body 19, from the top of the glazing line to the bottom of the sill. Each of the hoods 48 is connected to a vacuum recovery manifold 49 which, in turn, is connected to a suitable vacuum source 50.

FIG. 2 shows a pair of the inlet hood assemblies 46 and 47 in place on a vehicle body 19. The hoods 48 fit over the side window openings of the vehicle body 19 and pull the air inside the vehicle cabin into the hood through the action of the vacuum source 50. At the same time, make-up air enters the vehicle cabin from the windshield opening and the rear window opening.

It is noted that the cabin purge zone 45 not only provides a zone for the removal of powder from the cabin using the inlet hood assemblies 46 and 47; it also provides a knock-down or transition zone in which other oversprayed powder is removed from the booth 11 before the vehicle body exits the booth through the outlet 17. Accordingly, the cabin purge zone 45 may be the last zone in the booth 11 and may serve as the final transition zone.

The spraying of solid particulate powder presents special problems not present in the spraying of liquids. It is known that oversprayed powder has an ability to remain suspended in air almost indefinitely. Liquids, on the other hand, tend to settle much faster than powders. The cabin purge system of the present invention is designed to cope with the special problems of powder by removing the air from the cabin in an efficient manner. By removing the air quickly and efficiently, the need for a longer knock-down zone is reduced, and the spray line can operate at faster speeds, resulting in increased productivity.

An important feature in the purging system of the present invention is the creation of a symmetrical air flow pattern through the cabin. By using a pair of inlet hood assemblies 46 and 47, the cabin purge system removes the suspended powder from the vehicle cabin in a symmetrical manner. Make-up air enters the cabin from the windshield opening in the front of the vehicle and through the rear window opening in the back. The air inside the cabin is pulled from the cabin on each side as the make-up enters the cabin. This symmetrical air flow quickly and efficiently removes the air from the cabin and minimizes turbulence which may otherwise impede efficient air flow. It also avoids the creation of pockets within the vehicle cabin from which it is difficult to purge the suspended powder.

In essence, the system of the present invention splits the cabin in half for the purpose of removing the powder suspended in the cabin. Not only does this double the efficiency of the purging operation, it also facilitates air flow since make-up air enters from the front windshield opening and the rear window opening in a symmetrical manner and since the symmetrical air flow avoids the creation of pockets which could capture and hold powder for an extended period of time and retard the purging operation.

Other variations and modifications of the specific embodiments herein shown and described will be apparent to those skilled in the art, all within the intended spirit and scope of the invention. While the invention has been shown and described with respect to a particular embodiment thereof, this is for the purpose of illustration rather than limitation. Accordingly, the patent is not to be limited in scope and effect to the specific embodiment herein shown and described nor in any other way this is inconsistent with the extent to which the progress in the art has been advanced by the invention.

What is claimed is:

1. A method of powder spraying a workpiece having an exterior, a pair of side openings one on each side of the exterior, an additional opening on the exterior, and a hollow interior cavity connected to the openings, which comprises the steps of:

spraying powder on the exterior of the workpiece;

positioning a pair of inlet hood assemblies respectively at the side openings on each side of the workpiece;

connecting the pair of inlet hood assemblies to a vacuum source; and purging the cavity of excess powder by extracting the powder from the cavity through the inlet hood assemblies by operation of the vacuum source while allowing replenishing air to enter the cavity through the additional opening.

2. The method of powder spraying a workpiece as defined in claim 1, wherein the workpiece is an automobile vehicle body.

3. The method of powder spraying as defined in claim 1, wherein the workpiece is symmetrical about its longitudinal axis an the side openings are symmetrically located on each side of the workpiece, and wherein the purging step is accomplished by symmetrically extracting powder from the cavity using the inlet hood assemblies on both sides.

4. The method of powder spraying as defined in claim 3, wherein the additional opening is located in the front or back along the axis of symmetry.

5. The method of powder spraying as defined in claim 3, wherein the workpiece has additional openings in both the front and back along the axis of symmetry, and wherein the purging step includes allowing the replenishing air to enter the cavity substantially exclusively through the additional openings.

6. A method of powder spraying a vehicle body having an exterior, two opposed side window openings in the exterior, a front windshield opening in the exterior, a rear window opening in the exterior, and an interior cabin, which comprises the steps of:

spraying powder on the exterior of the vehicle body;

positioning a first inlet hood assembly at one of the side window openings;

positioning a second inlet hood assembly at the other of the side window openings;

connecting both the first and the second inlet hood assemblies to a vacuum source; and purging the cabin of excess powder by extracting the powder from the cabin through the inlet hood assemblies by operation of the vacuum source while allowing make-up air to enter the cabin through the windshield opening and the rear window opening.

7. A method of powder spraying as defined in claim 6, wherein the purging step is performed while allowing make-up air to enter the cabin substantially exclusively through the windshield opening and the rear window opening.

8. The method of powder spraying as defined in claim 6, wherein the spraying and purging steps are performed in a powder spray booth, comprising the additional step of providing a transition zone at the outlet of the booth to prevent pulling of powder overspray out of the booth.

9. The method of powder spraying a vehicle body as defined in claim 8, wherein the attaching and purging steps are performed in a cabin purge zone, and wherein the cabin purge zone is the transition zone.

* * * * *

UNITED STATES PATENT AND TRADEMARK OFFICE
CERTIFICATE OF CORRECTION

PATENT NO.  : 5,326,599
DATED       : July 5, 1994
INVENTOR(S) : Jeffrey R. Shutic It is certified that error appears in the above—identified patent and that said Letters Patent is hereby corrected as shown below:

Column 3, line 39, after "ceiling" insert --12,--

Column 5, line 15, delete "3e" and insert --38--

Signed and Sealed this

Fourth Day of October, 1994

Attest:

BRUCE LEHMAN

Attesting Officer    Commissioner of Patents and Trademarks